(12) United States Patent
Ahmed et al.

(10) Patent No.: US 11,550,980 B1
(45) Date of Patent: Jan. 10, 2023

(54) SYSTEM AND METHOD FOR GENERATING POWER-AWARE ELECTRONICS

(71) Applicant: Cadence Design Systems, Inc., San Jose, CA (US)

(72) Inventors: Tahrina Hossain Ahmed, San Jose, CA (US); Mohammad Rashedul Islam, San Jose, CA (US); Lishen Yin, San Jose, CA (US); Xin Fang, Bee Cave, TX (US); Khondakar Ahmed Mujtaba, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/346,929

(22) Filed: Jun. 14, 2021

(51) Int. Cl.
*G06F 30/3323* (2020.01)
*G06F 30/36* (2020.01)
*G06F 30/367* (2020.01)
*G06F 30/373* (2020.01)
*G06F 30/398* (2020.01)

(52) U.S. Cl.
CPC .......... *G06F 30/3323* (2020.01); *G06F 30/36* (2020.01); *G06F 30/367* (2020.01); *G06F 30/373* (2020.01); *G06F 30/398* (2020.01)

(58) Field of Classification Search
CPC ...... G06F 30/323; G06F 30/36; G06F 30/367; G06F 30/373; G06F 30/398; G06F 30/3323
USPC ....... 716/106, 109, 111, 136, 133, 134, 135; 703/15, 18, 19
See application file for complete search history.

(56) References Cited

U.S. PATENT DOCUMENTS

| | | | | |
|---|---|---|---|---|
| 5,790,836 A | * | 8/1998 | Mizuno | G06F 11/2635 703/22 |
| 5,867,399 A | * | 2/1999 | Rostoker | G01R 31/31704 714/E11.167 |
| 5,870,308 A | * | 2/1999 | Dangelo | G06F 30/00 716/108 |
| 6,484,135 B1 | * | 11/2002 | Chin | G06F 30/33 703/23 |
| 8,402,403 B2 | * | 3/2013 | Letz | G06F 30/33 716/108 |
| 8,669,778 B1 | * | 3/2014 | Or-Bach | H01L 27/11206 716/104 |
| 9,330,227 B1 | * | 5/2016 | Han | G06F 30/398 |
| 9,711,407 B2 | * | 7/2017 | Or-Bach | H01L 27/11578 |
| 2001/0007970 A1 | * | 7/2001 | Kohno | G06F 11/263 702/120 |

(Continued)

OTHER PUBLICATIONS

R. H. Dennard, et al., "Design of ion-implanted mosfet's with very small physical dimensions," IEEE Journal of Solid-State Circuits, Octobers, 1974.

(Continued)

*Primary Examiner* — Phallaka Kik
(74) *Attorney, Agent, or Firm* — Mark H. Whittenberger; Holland & Knight LLP

(57) ABSTRACT

The present disclosure relates to a method for use with an electronic design. Embodiments may include receiving one or more user defined processor configurations at a processor generator. Embodiments may also include generating a customized testbench based upon, at least in part, the user defined processor configurations and generating an RTL model while the customized testbench is generating.

20 Claims, 17 Drawing Sheets

(56) References Cited

U.S. PATENT DOCUMENTS

| | | | | |
|---|---|---|---|---|
| 2002/0147957 | A1* | 10/2002 | Matsui | G06F 30/30 716/102 |
| 2004/0093476 | A1* | 5/2004 | Thompson | G06F 9/5016 711/217 |
| 2005/0004777 | A1* | 1/2005 | Houlihane | G06F 30/33 702/119 |
| 2007/0136631 | A1* | 6/2007 | Govani | G01R 31/318536 714/738 |
| 2009/0144012 | A1* | 6/2009 | Haute | G06F 11/2236 702/117 |
| 2011/0022910 | A1* | 1/2011 | Bickler | G06F 11/2226 708/627 |
| 2011/0035203 | A1* | 2/2011 | Dalton | G06F 30/20 703/14 |
| 2011/0218779 | A1* | 9/2011 | Palisetti | G06F 30/00 703/2 |
| 2011/0307233 | A1* | 12/2011 | Tseng | G06F 30/33 703/21 |
| 2012/0096418 | A1* | 4/2012 | Takenaka | G06F 30/327 716/104 |
| 2015/0302126 | A1* | 10/2015 | Hamid | G06T 11/206 716/136 |
| 2017/0115969 | A1* | 4/2017 | Pendharkar | G06F 11/3664 |
| 2022/0121593 | A1* | 4/2022 | Nurvitadhi | G06F 13/4022 |

OTHER PUBLICATIONS

H. Esmaeilzadeh, et al., "Dark Silicon and the End of Muiticore Scaling," In ISCA '11, 2011, pp. 365-376.

T, Dillinger, "ESL Architectural Power Estimation Support from TSMC—yes, TSMC," SemiWiki.com. Sep. 22, 2016, 3 pages.

Cadence Design Systems, "Cadence Palladium Z1 Enterprise Emulation Platform," retrieved from www.cadence.com. 2015.

Cadence Design Systems, "Joules RTL Power Solution," retrieved from www.cadence.com. 2019, 7 pages.

* cited by examiner

List of Supported Tensilica Product Configurability

| Config Space | Options | Parameter | LX | NX | DNA |
|---|---|---|---|---|---|
| Data Cache (dcache) | ecc | way/assoc, width/linesize, access latency, | | | |
| EDIE | | | | | |
| iDMA Reorder-Buffer | | Buffer Size | | | |
| Instruction ache (icache) | ecc | way/assoc, width/linesize, access latency, | | | |
| Instruction RAM (IRAM) | ecc | width, banks, latency, pSize, no_of_rams | | | |
| Instruction ROM (IROM) | | width | | | |
| Instruction Set | Floating Point | Single/ Double Precision Floating point | | | |
| Instruction Set | Fix Point | 8,16,32 | | | |
| Instruction Set | Divider | | | | |
| Instruction Set | MAC | Bit-Size | | | |
| Integrated DMA (iDMA) | Reorder-Buffer | DataWidth, AddressWidth, Buffer Depth | | | |
| Integrated DMA (iDMA) | | DescriptorSize=64, MaxOutStanding, Channels, AXI-AXI Ch | | | |
| Interrupt Vector | | BaseAddress, level, offset, size | | | |
| Interrupts | | Num of Interrupts | | | |
| L2 Cache/RAM | | Base Address, Line Size, Control register | | | |
| LoadStore Unit | | No of Units | | | |
| Local Data ROM | | | | | |
| Master AXI | Inst/Data/iDMA | * | | | |
| MMU | | No_of_entries | | | |
| No PIF | | | | | |
| On Chip Debugger (OCD) | APB-Debug | | | | |
| Performance Monitor | | Performance Counter | | | |
| Pipeline Length | | | | | |
| PowerGate (PSO) | | | | | |
| Prefetch | | | | | |
| Prefetch | | | | | |
| Processor Interface (PIF) | Attribute, ByteEnabl | Data Width, Read/write buffer depth | | | |
| Registerfile No of Registers | | 16,32,64 | | | |
| Scan | | | | | |
| Scatter-gather | | Sub bank | | | |
| Slave APB | | | | | |
| Slave AXI | Inst/Data/DMA | | | | |
| SysRAM | | base_address, pSize | | | |
| SysROM | | base_address, pSize | | | |
| TIE Port | | input/output | | | |
| TIE Queue | | input/output | | | |
| TIELookup | | | | | |
| Traceport | ATB, Trace, Data | | | | |
| TRAX | | Trace RAM Size | | | |
| Vector/DataRAM | ecc | width, banks, latency, pSize, no_of_rams | | | |
| XNNE | | Base Address, NumOfSysInf, SBks, MBks, UBufSize | | | |
| Zero overhead loop | | Size | | | |

FIG. 17

SYSTEM AND METHOD FOR GENERATING POWER-AWARE ELECTRONICS

FIELD OF THE INVENTION

The embodiments of the present disclosure relate to a method of electronic circuit design, and more particularly, to a method for generating power-aware processors and devices.

BACKGROUND

Customizable processors that perform intensive data processing are designed to provide programmability in the performance-intensive dataplane of the system-on-chip (SoC) design. Not only do they combine the capabilities of a digital signal processor (DSP) and a central processing unit (CPU), but they can be customized to maximize efficiency for a target application.

While processors are often used for the control functions in SoC designs, designers turn to register-transfer-level (RTL) blocks for many data-intensive functions that control processors can't handle. However, RTL blocks take a long time to design and even longer to verify, and they are not programmable to handle multiple standards or designs. The most common embedded microprocessor architectures—such as the ARM®, MIPS, and PowerPC processors—were developed in the 1980s for stand-alone microprocessor chips. These general-purpose processor architectures, or CPUs, are good at executing a wide range of algorithms with a focus on control code, but SoC designers often need more performance in critical datapath portions of their designs than these microprocessor architectures can deliver. To bridge this performance gap, the two most-used approaches are to run the general-purpose processor at a higher clock rate (thus extracting more performance from the same processor architecture), or to hand-design acceleration hardware that offloads some of the processing burden from the processor. Running a general-purpose processor core at a high clock rate incurs a power and area penalty, and designing acceleration hardware takes additional development time, not just for the design but for verification of the new acceleration hardware. In fact, verification can consume as much as 70% to 80% of the total design time. Customizable processors can achieve high performance and lower energy consumption, save time, and provide design flexibility versus hand-coded RTL hardware or a general-purpose processor.

SUMMARY

Accordingly, embodiments of the present disclosure are directed to a computer-implemented method for use with an electronic design. The method may include receiving one or more user defined processor configurations at a processor generator. The method may also include generating a customized testbench based upon, at least in part, the user defined processor configurations and generating a register transfer level (RTL) model while the customized testbench is generating.

One or more of the following features may be included. In some embodiments, the method may include providing the customized testbench and the RTL model to an emulation platform. The method may further include providing the customized testbench and the RTL model to power analysis platform. The method may also include displaying a graphical user interface that allows for hotspot analysis of a specific configuration and a specific use case. The method may further include displaying a graphical user interface that allows for power consumption analysis for multiple configurations with multiple use cases. The method may include receiving user-defined run-time parameters at the customized testbench. In some embodiments, providing the customized testbench and the RTL model to an emulation platform may occur during run-time.

In another embodiment of the present disclosure a computer-readable storage medium having stored thereon instructions, which when executed by a processor result in a number of operations is provided. Operations may include receiving one or more user defined processor configurations at a processor generator. Embodiments may also include generating a customized testbench based upon, at least in part, the user defined processor configurations and generating a model of an electronic circuit design while the customized testbench is generating.

One or more of the following features may be included. In some embodiments, the method may include providing the customized testbench and the model to an emulation platform. Operations may further include providing the customized testbench and the model to power analysis platform. Operations may also include displaying a graphical user interface that allows for hotspot analysis of a specific configuration and a specific use case. Operations may further include displaying a graphical user interface that allows for power consumption analysis for multiple configurations with multiple use cases. Operations may include receiving user-defined run-time parameters at the customized testbench. In some embodiments, providing the customized testbench and the model to an emulation platform may occur during run-time.

In yet another embodiment of the present disclosure a computing system for use in an electronic circuit design is provided. The system may include a processor generator configured to receive one or more user defined processor configurations and simultaneously generate an RTL model and a customized testbench based upon, at least in part, the user defined processor configurations, wherein the customized testbench is mapped to an emulation platform during run-time.

One or more of the following features may be included. In some embodiments, the method may include providing the RTL model to an emulation platform. The method may further include providing the customized testbench and the RTL model to power analysis platform. The method may also include a graphical user interface that allows for hotspot analysis of a specific configuration and a specific use case. The method may further include a graphical user interface that allows for power consumption analysis for multiple configurations with multiple use cases. The method may include receiving user-defined run-time parameters at the customized testbench. In some embodiments, providing the customized testbench and the RTL model to an emulation platform may occur during run-time.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIGS. 6-17 are graphical user interfaces associated with the power-aware architecture generation process according to various embodiments of the present disclosure.

DETAILED DESCRIPTION

Figure 1:
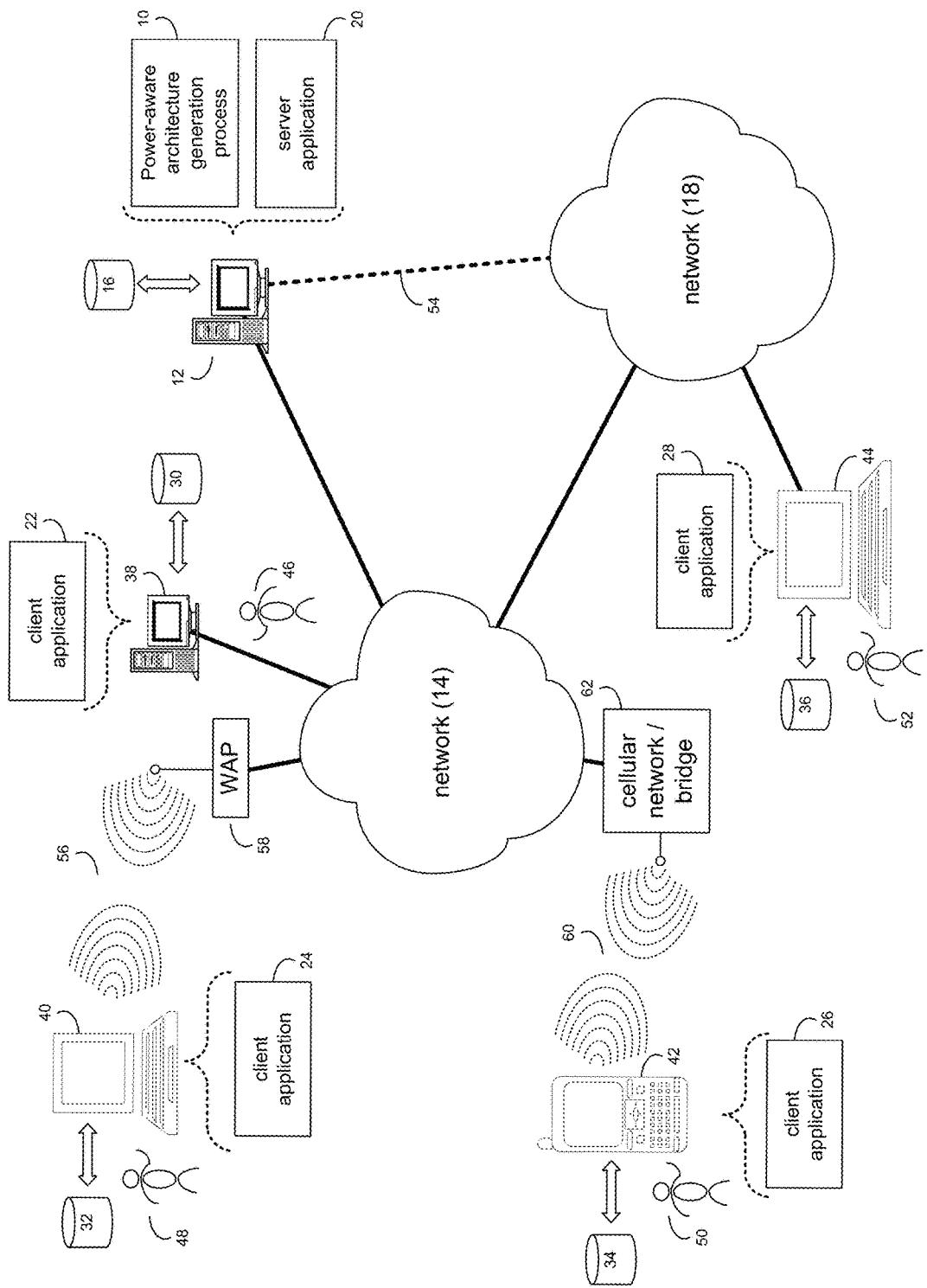
FIG. 1 diagrammatically depicts a power-aware architecture generation process coupled to a distributed computing network.

Embodiments of the present disclosure are directed towards a system and method to generate a power aware product by integrating a synthesizable testbench, emulation platform, and power estimator that ensures faster turnaround with acceptable accuracy.

The power-aware architecture generation process described herein may enable power analysis capabilities with various graphical interfaces to cover different aspects during hardware and software development phases. Some of these may include, but are not limited to, hotspot analysis for a specific configuration with a specific use case, and/or overall power consumption analysis for multiple configurations with multiple use cases, etc.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity Like reference numerals in the drawings denote like elements.

Referring to FIG. 1, there is shown power-aware architecture generation process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the power-aware architecture generation process may reside on a client electronic device, such as a personal computer, notebook computer, personal digital The instruction sets and subroutines of power-aware architecture generation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS Novell Webserver or Apache Webserver that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute power-aware architecture generation process 10. Examples of client applications 22, 24, 26, 28 may include, but are not limited to, design verification tools such as those available from the assignee of the present disclosure. These applications may also be executed by server computer 12. In some embodiments, power-aware architecture generation process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the power-aware architecture generation process may be a client-side application (not shown) residing on one or more client electronic devices 38, 40, 42, 44 (e.g., stored on storage devices 30, 32, 34, 36, respectively). As such, the power-aware architecture generation process may be a stand-alone application that interfaces with a client application (e.g., client applications 22, 24, 26, 28), or may be an applet/application that is executed within a client application. As such, the power-aware architecture generation process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, power-aware architecture generation process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
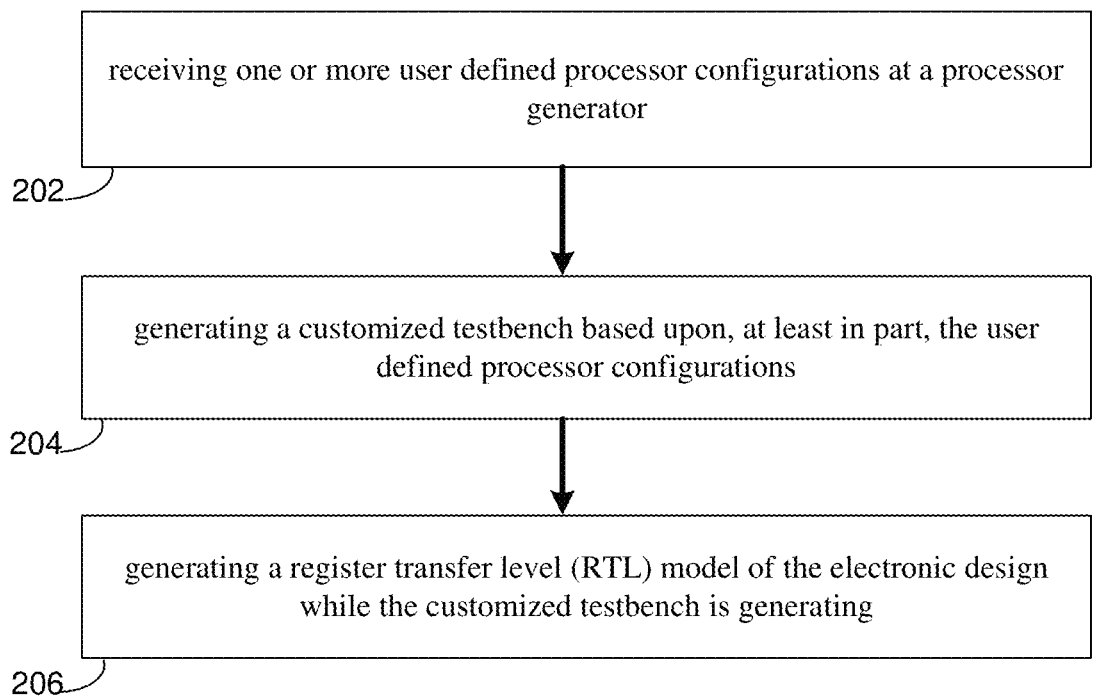
FIG. 2 is an exemplary flowchart of a power-aware architecture generation process according to an embodiment of the present disclosure.
Figure 3:
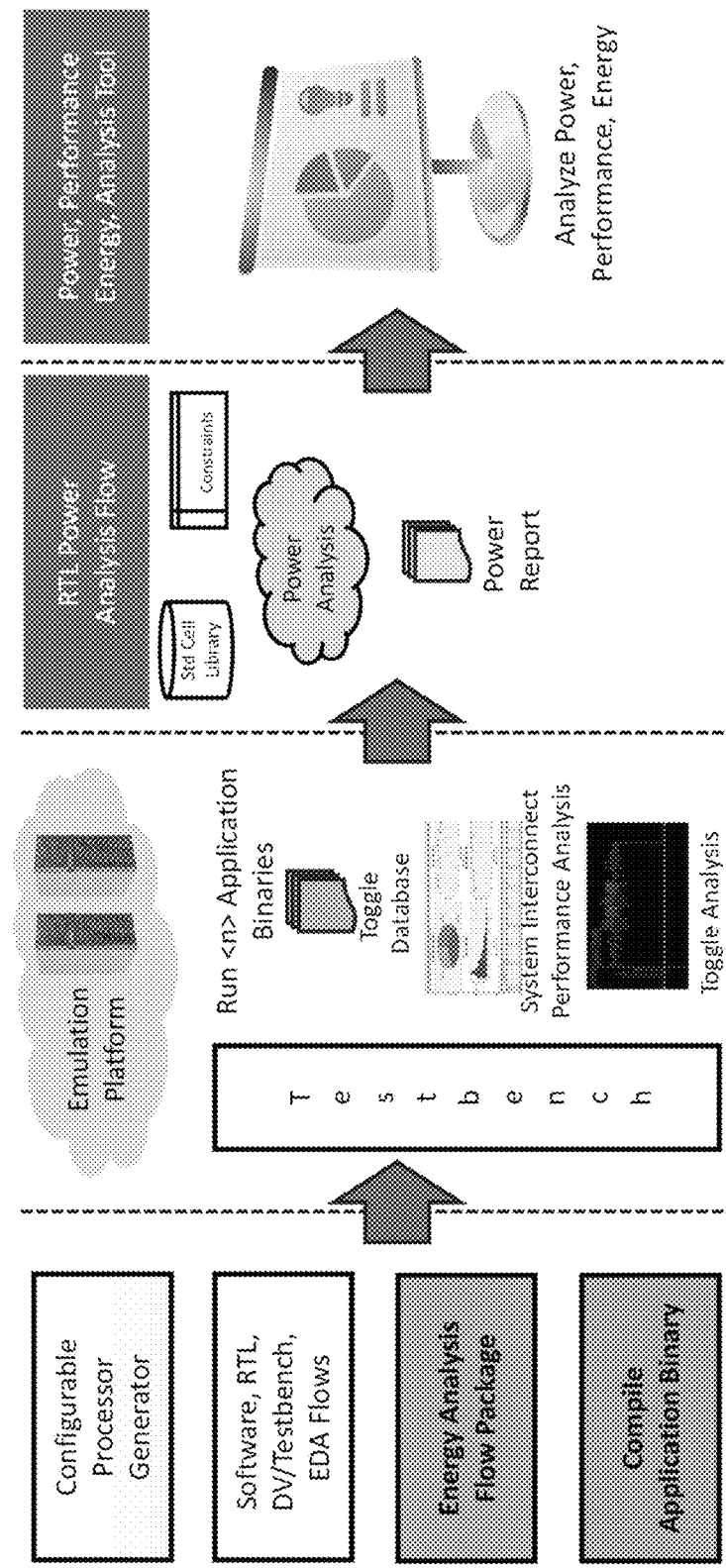
FIG. 3 is an illustration of a schematic of a power-aware architecture generation process according to an embodiment of the present disclosure.
Figure 4:
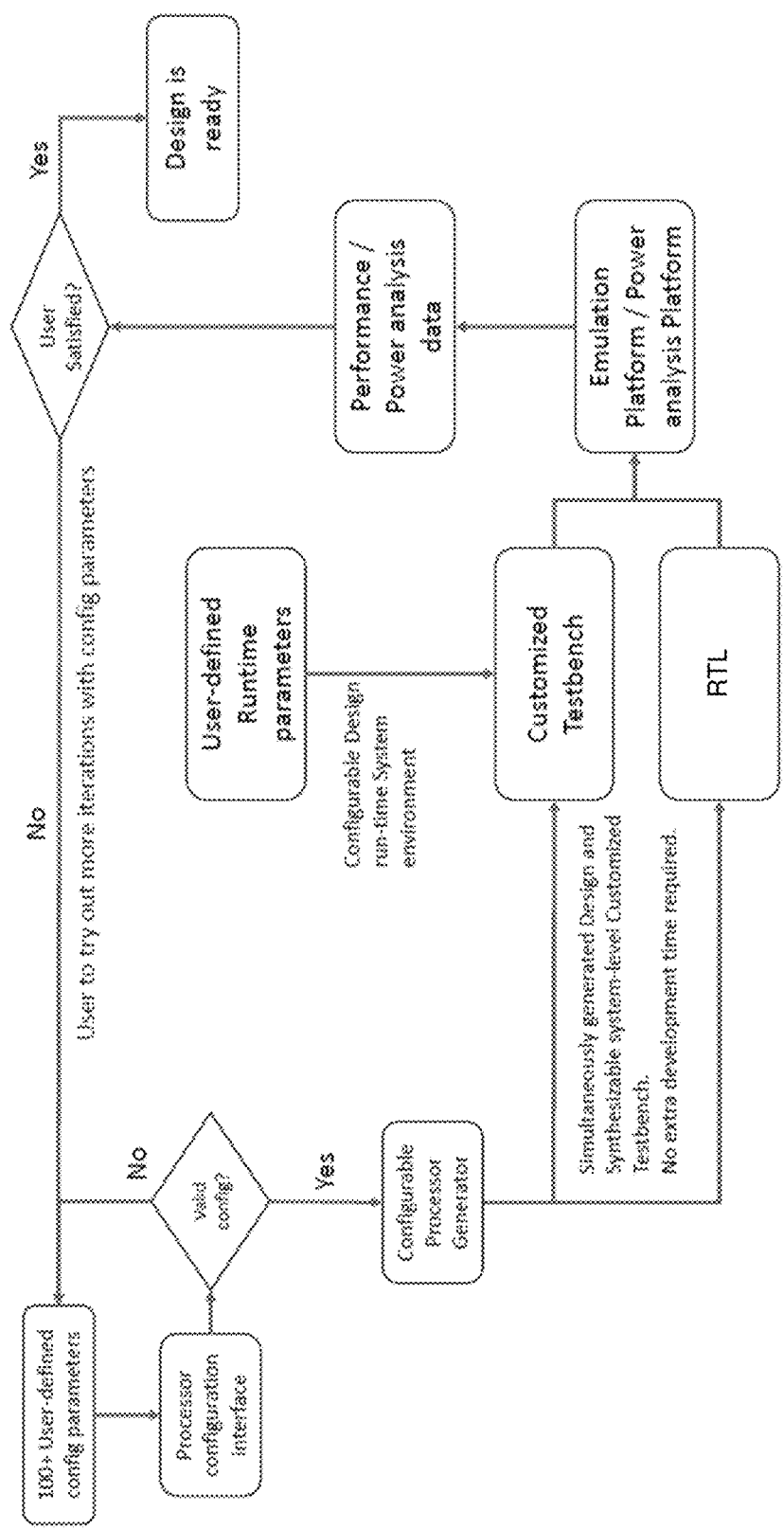
FIG. 4 is an exemplary flowchart of a power-aware architecture generation process according to an embodiment of the present disclosure.

Referring now to FIG. 2, a flowchart depicting an embodiment consistent with power-aware architecture generation process 10 is provided. The method may include receiving (202) one or more user defined processor configurations at a processor generator. The method may also include generating (204) a customized testbench based upon, at least in part, the user defined processor configurations and generating (206) a register transfer level (RTL) model of the electronic design while the customized testbench is generating. Numerous other operations are also within the scope of the present disclosure as provided in further detail hereinbelow.

Referring now to FIGS. 3-17, embodiments depicting a power-aware architecture generation process 10 are provided. Some processors, DSPs, and artificial intelligence (AI) accelerators (such as the Tensilica brand available from the Assignee of the present disclosure) have been renowned for their robust characteristics such as configurability and extensibility. However, with an inevitable breakdown of Dennard scaling [see, e.g., R. H. Dennard, F. H. Gaensslen, V. L. Rideout, E. Bassous, and A. R. LeBlanc. *Design of ion-implanted mosfet's with very small physical dimensions.* IEEE Journal of Solid-State Circuits, Oct. 9, 1974 and also H. Esmaeilzadeh, E. Blem, R. S. Amant, K Sankaralingam, and D. Burger. *Dark Silicon and the End of Multicore Scaling.* In ISCA 2011.], it has been pivotal to focus on power/energy efficient scalable architecture and design.

As discussed above, embodiments of the present disclosure are directed towards a system and method to generate a power aware product by integrating a synthesizable testbench, emulation platform, and power estimator that ensures faster turnaround with acceptable accuracy.

Referring again to FIG. 3, a diagram 300 showing a multi-stage procedure consistent with embodiments of the present disclosure is provided. In a first stage, end users may select their own processor specification utilizing configurable processor generator tool options. Once they specify their processor configuration, they would submit the configuration file to the processor generator for building the processor. The processor generator may be configured to generate different required components of the processors such as the software, the hardware (RTL/Logic), the design verification testbench, and the EDA scripts to implement the processor. Along with these conventional components, power-aware architecture generation process 10 enhances the processor generator to generate a customized synthesizable testbench for any arbitrary user specified processors. Once all the components are ready, the user may create application code and generate the binary that they wanted to run on this synthesizable testbench to generate power/energy numbers.

In the second stage, the user may take the synthesizable testbench and compile them targeting an emulation platform (e.g., Palladium available from the Assignee of the present disclosure). Once the testbench is compiled, they would take the application binaries (compiled in the last step of stage 1) and run them on the emulation platform. The emulation platform would run the binary and generate the toggle database for the design, which would be used in stage 3 for generation power/energy numbers.

In addition to generating the toggle database, users could optionally perform additional analysis using the testbench described herein. For example, using a system level analysis tool (e.g. Interconnect Work-Bench (IWB)), may use the system to analyze latency and bandwidth of their system level components (such as interconnect and memory subsystems) and optimize them to achieve the best power/energy for their processor and the entire system.

In some embodiments, power-aware architecture generation process 10 may allow users to employ a toggle analysis feature (e.g. Dynamic Power Analysis (DPA)) to obtain a high-level power estimate for their design. Also, they could iteratively compare design A vs design B, or application code X vs code Y and converge towards the most power efficient design and/or application code.

In the third stage, once the toggle database is generated from stage 2, power-aware architecture generation process 10 may allow a user to run a power analysis tool (e.g. Joules available from the Assignee of the present disclosure) to perform RTL level power estimation. In addition to the toggle database from stage 2, users would need to provide comprehensive design implementation details. For example, various technology node-specific library files that typically are provided by the foundry. They also need to provide design implementation constraints e.g. target clock period, target power goal etc. so the power analysis tool could use that information to derive the best power estimate.

In the fourth stage, users would utilize a performance and power analysis tool (PAT), that captures the information from stages 2 and 3, and graphically represents the data through generating interactive tables and charts. This feature would enable users to visualize their specified design space with respect to power/performance/energy efficiency tradeoffs and make an informed decision.

In some embodiments, power-aware architecture generation process 10 described herein may enable power analysis capabilities with various graphical interfaces to cover different aspects during hardware and software development phases. Some of these may include, but are not limited to, hotspot analysis for a specific configuration with a specific use case, and/or overall power consumption analysis for multiple configurations with multiple use cases, etc.

In some embodiments, power-aware architecture generation process 10 may include a process to generate customized synthesizable testbenches that enable power aware products (e.g. Tensilica available from the Assignee of the present disclosure). Process 10 allows for hardware scalability that may support all extensible and configurable processors, DSPs and AI accelerators. Concurrent generation of the design (e.g., RTL model) and testbench (e.g., simulation model) ensures no dependency or additional time overhead. Process 10 allows for software scalability, for example, any number of use cases may be supported for evaluating dynamic power. Embodiments included herein may be process node and foundry agnostic.

Accordingly, embodiments of the present disclosure describe a methodology for power-aware processor architecture generation. The power-aware architecture generation process 10 described herein may integrate a synthesizable testbench into a processor generator approach that utilizes an emulation platform (e.g., Palladium available from the Assignee of the present disclosure) and a power estimator (e.g., Joules RTL Power Solution available from the Assignee of the present disclosure) to produce fast and accurate power during the design definition phase without going through conventional EDA flow development followed by gate simulation runs, and finally a power analysis process.

Traditionally, simulation based testbenches are non-synthesizable. Thus, those testbenches cannot be mapped into an emulation platform, and will require run-time in the CPU server. This CPU run-time is often the bottle-neck for simulation, which prevents the user from running long diags or any real applications in a reasonable time.

Figure 5:
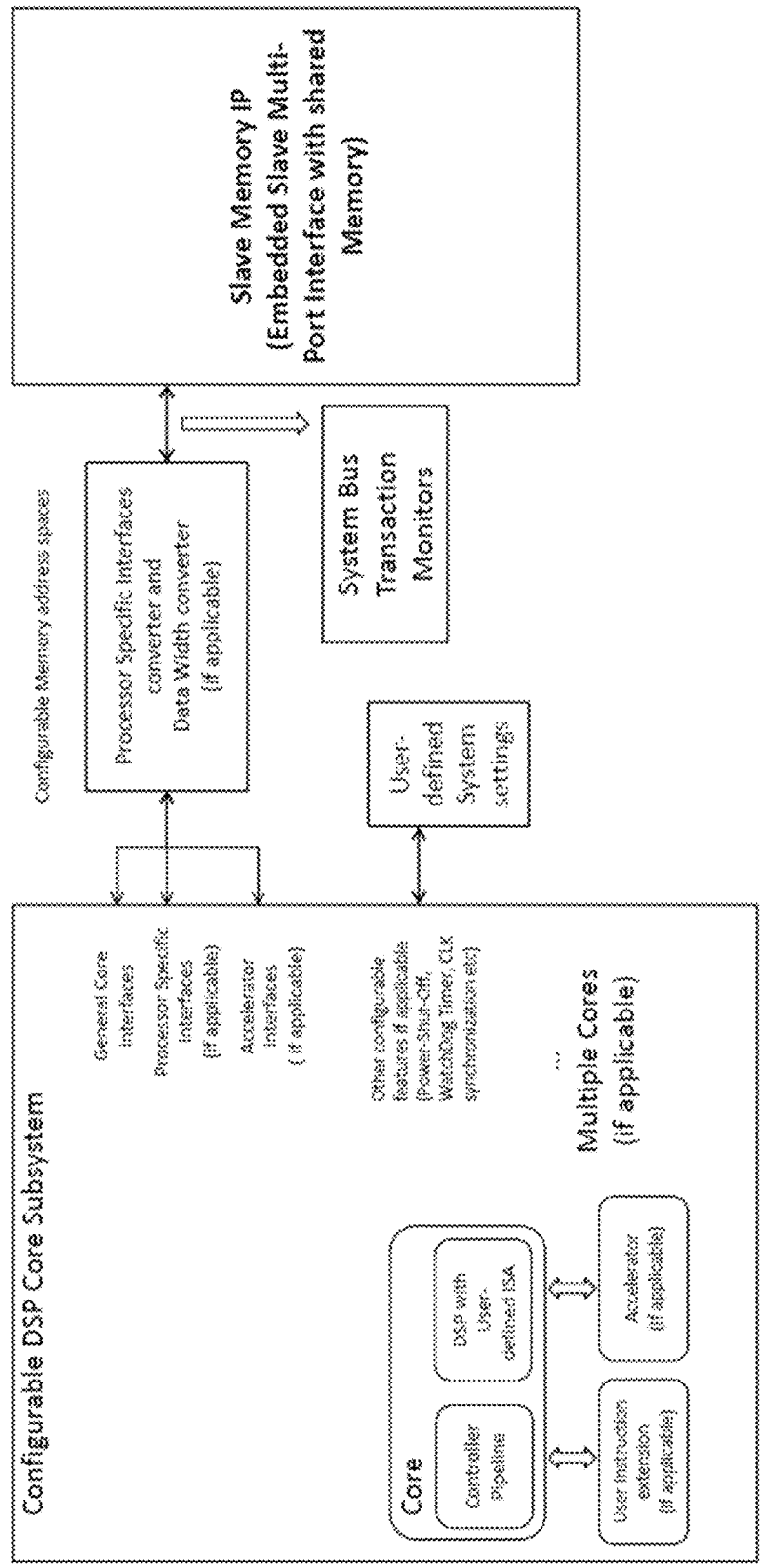
FIG. 5 is an illustration of a schematic of a power-aware architecture generation system according to an embodiment of the present disclosure.

Referring now to FIG. 5, a diagram 500 showing a configurable subsystem consistent with embodiments of power-aware architecture generation process 10 is provided. Embodiments of power-aware architecture generation process 10 described herein provide an emulation testbench structure that offers a synthesizable testbench that supports configurable products (e.g. Xtensa products available from the Assignee of the present disclosure), along with system-level performance analyzing ability. All components in this testbench may be downloaded and/or mapped to an emulation platform during run time, to achieve the best emulation run-time performance.

In some embodiments, the testbench of power-aware architecture generation process 10 enables a user to quickly put products (e.g., Xtensa) in a real-application and to analyze power consumption using a very fast turn-around-time with high accuracy. The testbench may support numerous subsystem products. User can configure its own processor base on their use-case. #2: Multi-Port slave memory supports configurable transaction ports based on various products (e.g., Xtensa). Memory address spaces from the processor are configurable. System delay/bandwidth can also be tuned within the AVIP slave. #3: All other product (e.g., Xtensa) features can be configured through system-level settings, which brings the correct signal connections to products (e.g., Xtensa) and enable the processor in certain modes that user defined. #4: There will be an IWB Monitor for each port for interconnect performance analysis.

In some embodiments, power-aware architecture generation process 10 may enable architects and developers to quickly explore many possible options of the configurable core and determine the most energy efficient design and/or application software. In operation, a user/customer makes a selection about their processor configurations from the available 200+ options (e.g., options illustrated in FIG. 6 and FIG. 17), as well use custom extensions to their instruction set, and then submits the processor build to a processor generator (e.g., XPG (Xtensa Processor Generator)). The testbench generation may be fully integrated to the XPG build flow. Power-aware architecture generation process 10 may identify all the configuration options for that specific configuration and generate the customized testbench and other necessary components that may be tailored for the specific configuration. Using the software tools provided in the package, the user may generate the application program's binary targeting the processor and the system level parameters. The system level performance analysis capability may be part of the testbench, to analyze and optimize system level memory latency/bandwidth to achieve energy efficiency. Power-aware architecture generation process 10 may use the completely synthesizable testbench to run the application binary in an emulation platform, analyze the power consumption, compare power/cycle/energy, and identify the most energy efficient processor and/or application software.

Figure 6:

Referring now to FIGS. 6-17, graphical user interfaces consistent with embodiments of power-aware architecture generation process 10 are provided. FIGS. 6-9 show a methodology for building a configuration and set up. FIG. 6 shows a graphical user interface 600 that allows the user to select one or more configuration options from many available choices. FIG. 6 captures one of the options (interface) with multiple sub-options (e.g., master interface, slave interface, port and que interfaces, prefetch options, etc.) in a processor configuration tool. It should be noted that the configuration options are provided merely by way of example as any number of configurations may be used without departing from the scope of the present disclosure.

Figure 7:
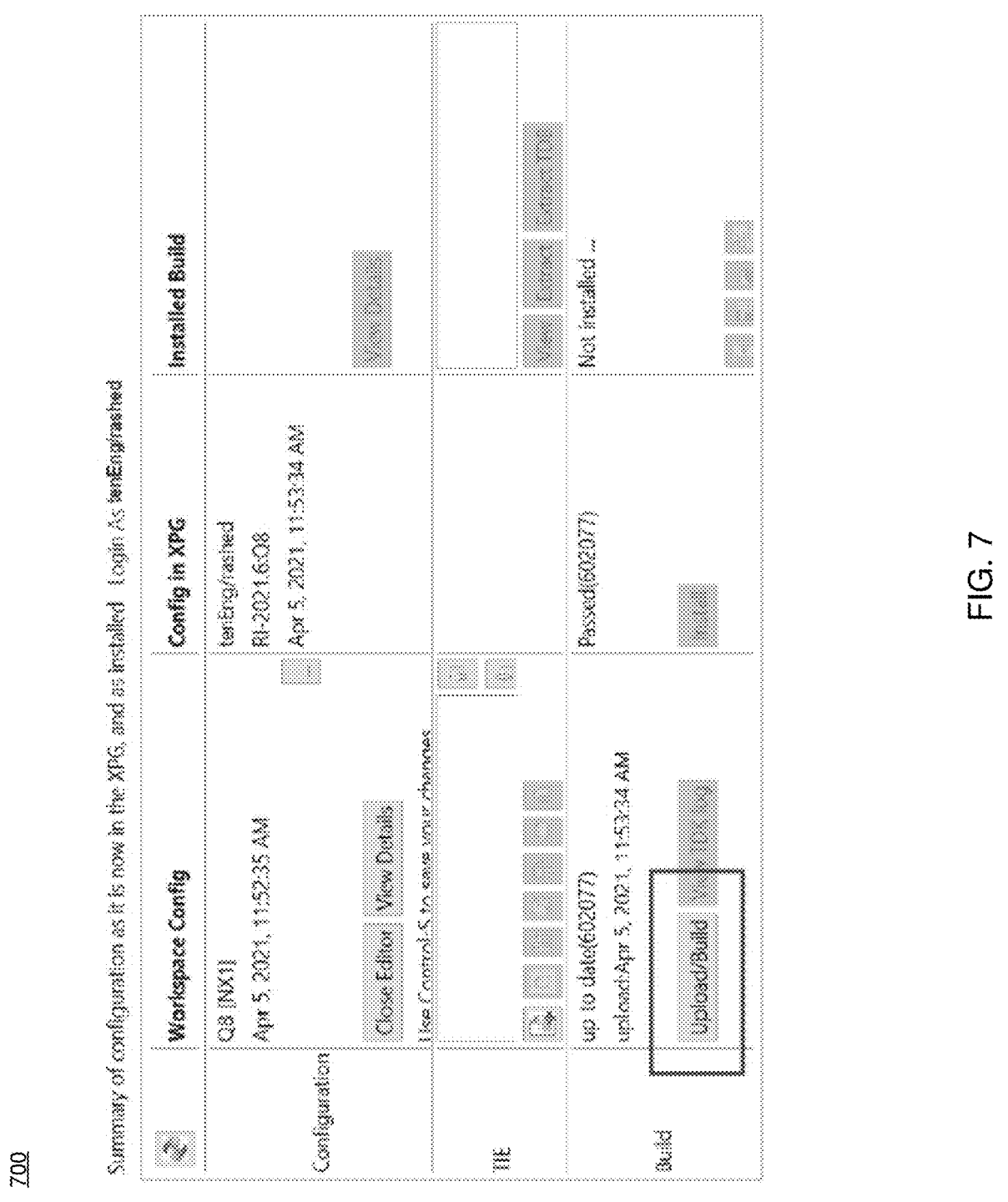
Figure 8:
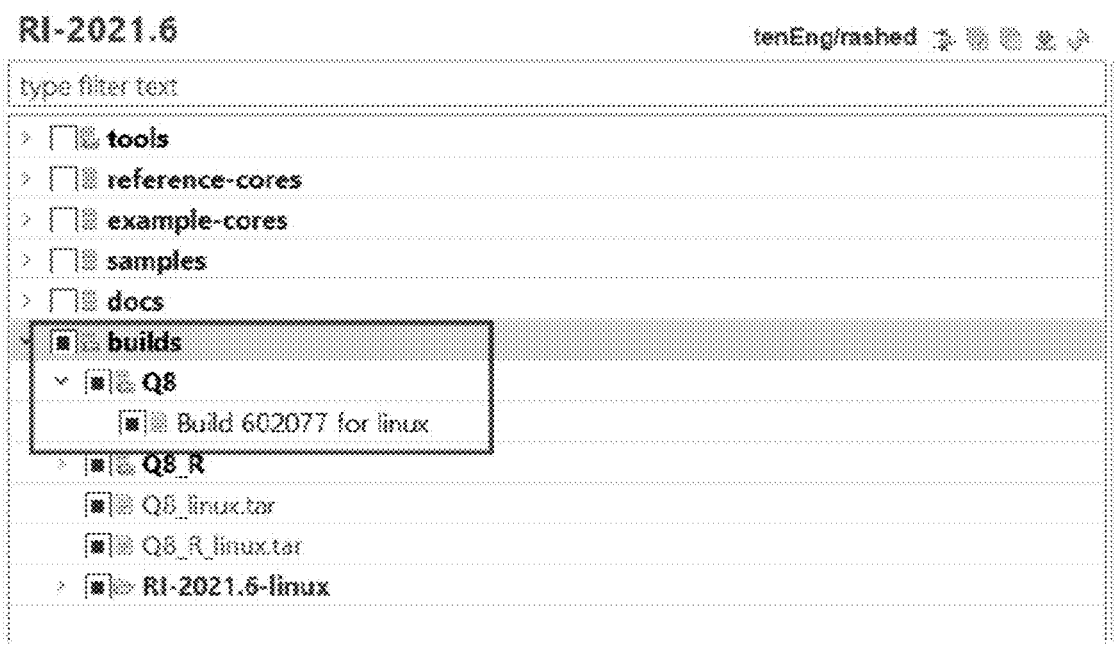
Figure 9:

Referring also to FIGS. 7-9, additional examples of GUIs consistent with embodiments of power-aware architecture generation process 10 are provided. FIG. 7 shows a graphical user interface 700 that allows the user to build the configuration in the processor generator. GUI 700 allows the user to submit a build in the processor generator using embodiments of the present disclosure. GUI 800 allows the user to download/install the build from the processor generator. The downloaded build may include everything needed to run power-aware architecture generation process 10. GUI 900 depicts an example showing the contents of power-aware architecture generation process 10 package.

Figure 10:
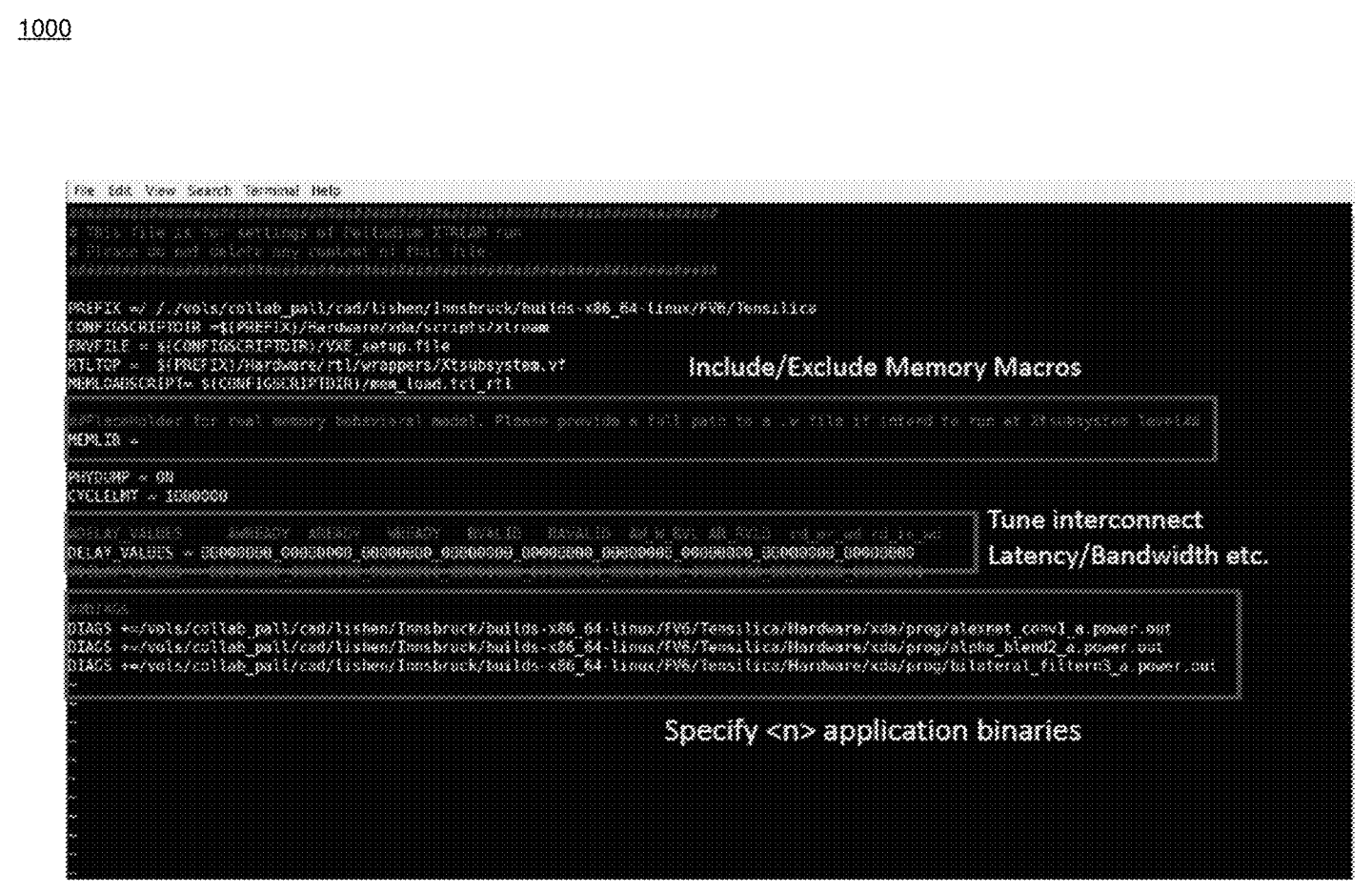
Figure 11:

Referring now to FIGS. 10-11, examples graphical user interfaces that may be used to setup the environment and run emulation (e.g. using Palladium available from the Assignee of the present disclosure). This allows for easy setup and enable features. Embodiments included herein provide full automation to build and run a Testbench (e.g. Palladium).

Figure 12:
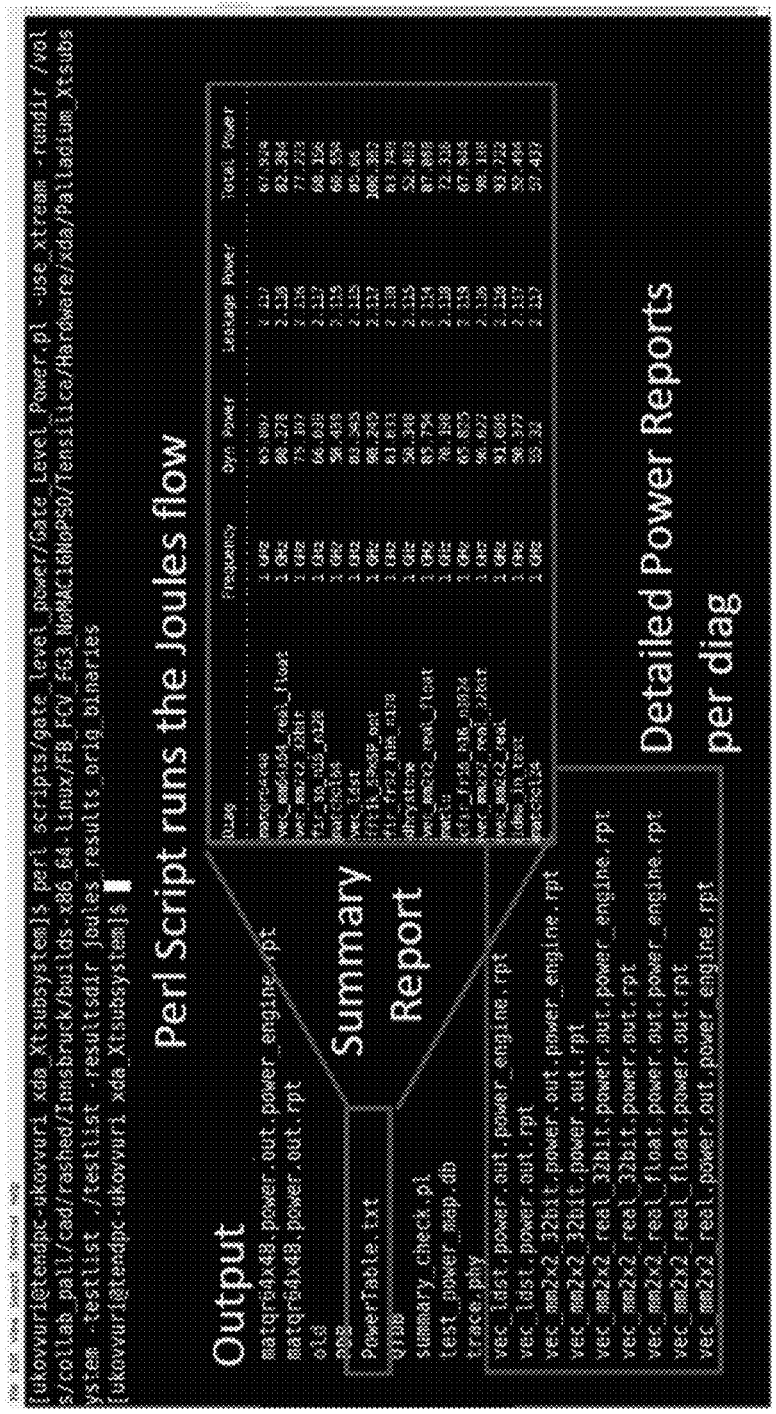

Referring now to FIG. 12, a graphical user interface 1200 showing an example that may be used to automatically run a power estimation (e.g. Joules) analysis. In this example, a script may perform the flow and generate a summary report and one or more detailed power reports as shown in FIG. 12.

Figure 13:
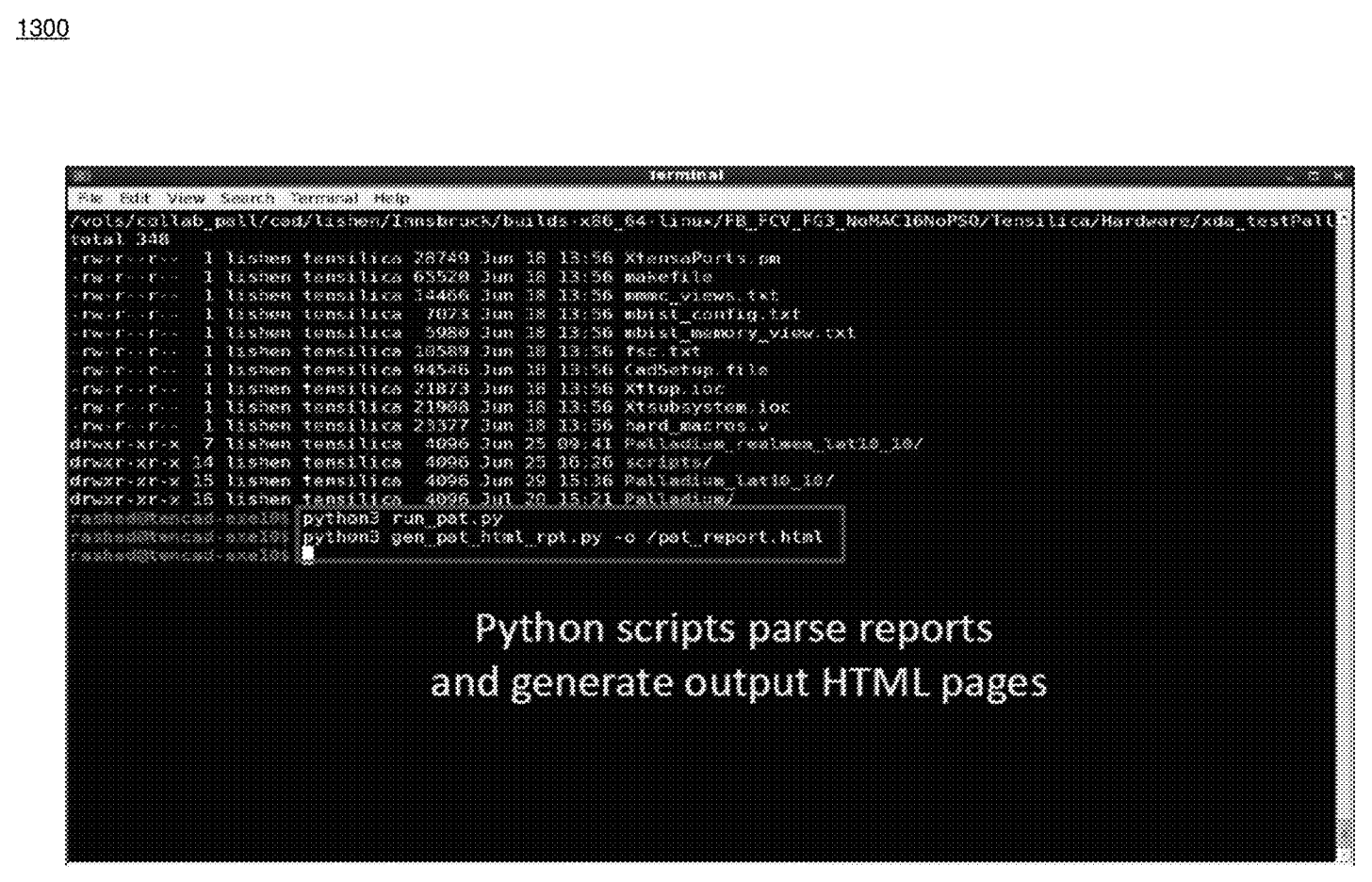
Figure 14:
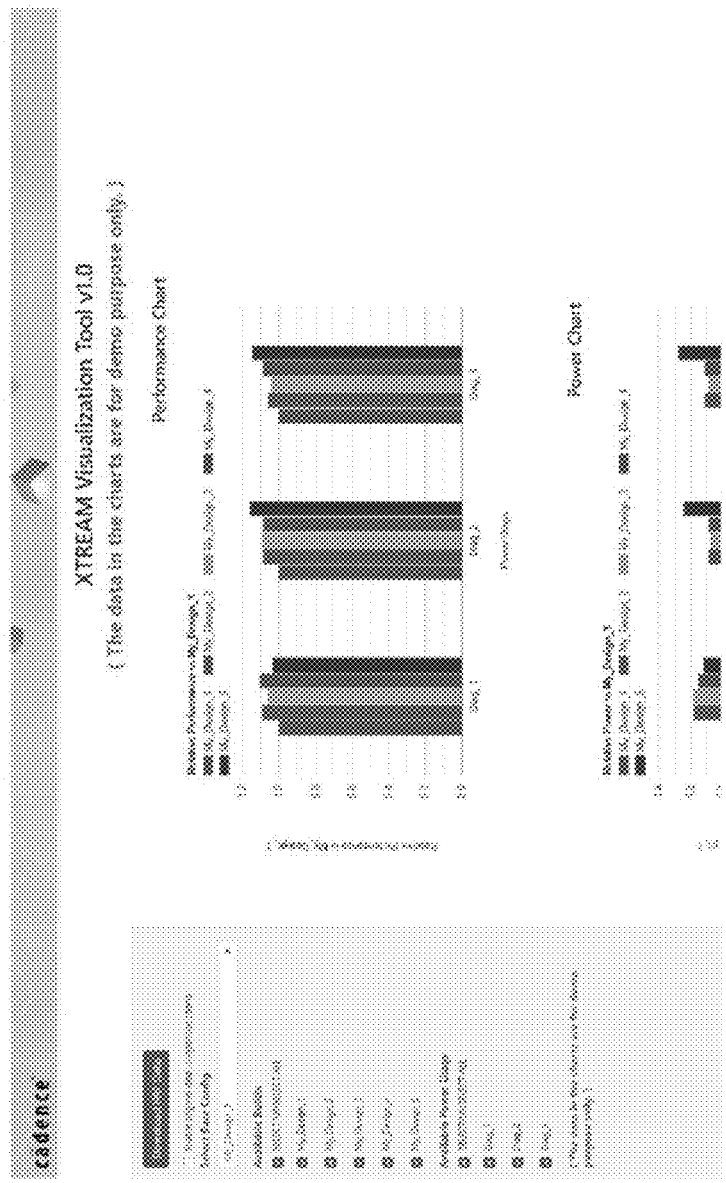

Referring now to FIGS. 13-14, graphical user interfaces 1300, 1400 showing examples that may be used to analyze power, performance, and/or energy. As shown in FIG. 13, one or more scripts may be used to parse reports and generate output pages such as HTML. FIG. 14 shows an example display that shows both relative performance and relative power.

Figure 15:
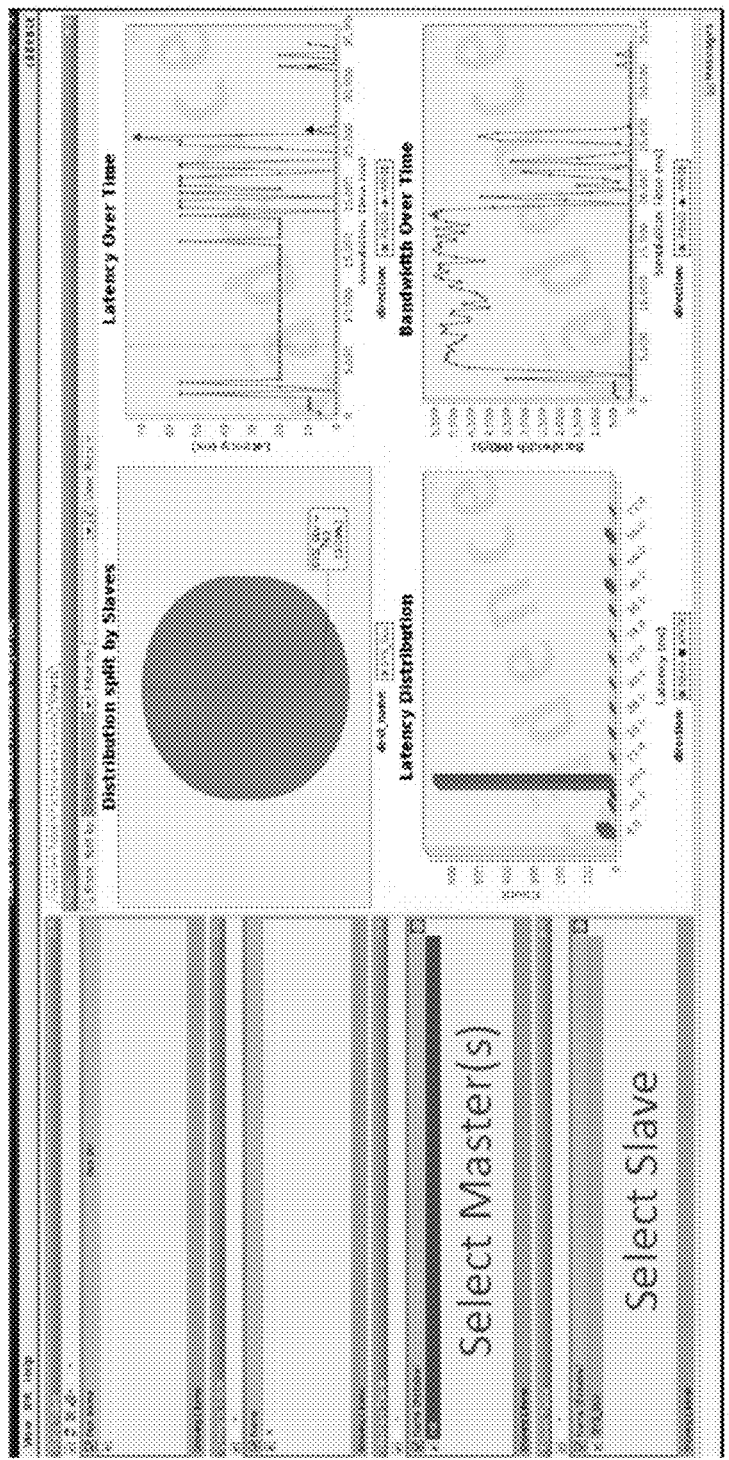

Referring now to FIG. 15, a graphical user interface 1500 showing an example interconnect work-bench GUI is provided. GUI 1500 shows temporal latency/bandwidth data for all of the interfaces. More specifically, GUI 1500 includes displays reflecting distribution split by slaves, latency over time, latency distribution, bandwidth over time, etc.

Figure 16:
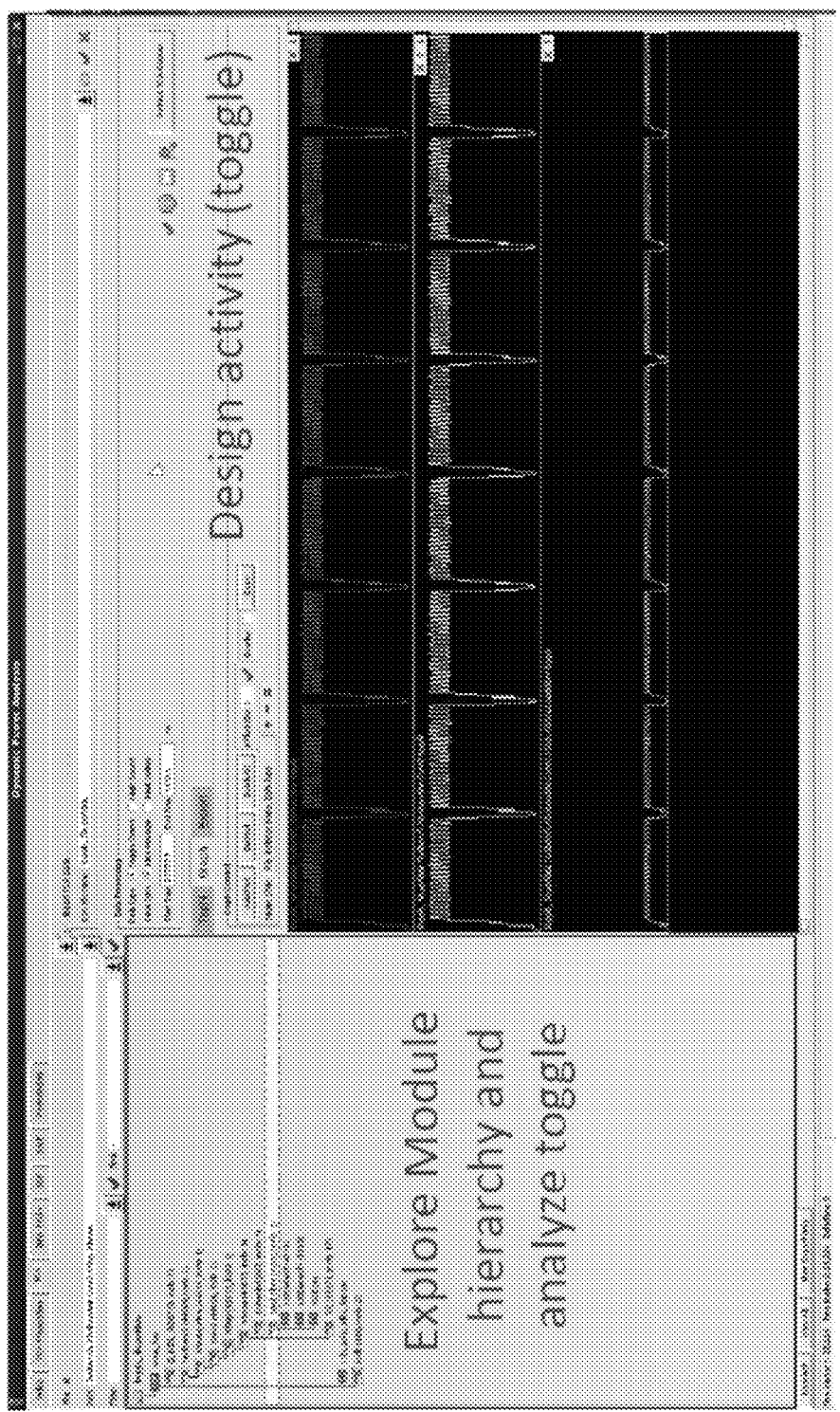

Referring now to FIG. 16, a graphical user interface 1600 showing an example dynamic power analysis GUI is provided. GUI 1600 may allow the user to explore module hierarchy and analyze toggle. Design activity may also be displayed.

Referring now to FIG. 17, a table is providing listing one or more possible options with respect to various configurations for different products. In this particular example controllers (e.g., LX/NX) and AI accelerators (e.g., DNA) are provided.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:
    receiving one or more user defined processor configurations at a processor generator;
    generating a customized testbench based upon, at least in part, the user defined processor configurations; and
    generating a register transfer level (RTL) model of the electronic design while the customized testbench is generating.

2. The computer-implemented method of claim 1, further comprising:
    providing the customized testbench and the RTL model to an emulation platform.

3. The computer-implemented method of claim 2, further comprising:
    displaying a graphical user interface that allows for hotspot analysis of a specific configuration and a specific use case.

4. The computer-implemented method of claim 2, further comprising:
    displaying a graphical user interface that allows for power consumption analysis for multiple configurations with multiple use cases.

5. The computer-implemented method of claim 2, wherein providing the customized testbench and the RTL model to an emulation platform occurs during run-time.

6. The computer-implemented method of claim 1, further comprising:
    providing the customized testbench and the RTL model to a power analysis platform.

7. The computer-implemented method of claim 1, further comprising:
    receiving user-defined run-time parameters at the customized testbench.

8. A non-transitory computer-readable storage medium having stored thereon instructions, which when executed by a processor result in the following operations:
    receiving one or more user defined processor configurations at a processor generator;
    generating a customized testbench based upon, at least in part, the user defined processor configurations; and
    generating a model of the electronic design while the customized testbench is generating.

9. The computer-readable storage medium of claim 8, the operations further comprising:
    providing the customized testbench and the model to an emulation platform.

10. The computer-readable storage medium of claim 9, the operations further comprising:
    displaying a graphical user interface that allows for hotspot analysis of a specific configuration and a specific use case.

11. The computer-readable storage medium of claim 9, the operations further comprising:
    displaying a graphical user interface that allows for power consumption analysis for multiple configurations with multiple use cases.

12. The computer-readable storage medium of claim 9, wherein providing the customized testbench and the model to an emulation platform occurs during run-time.

13. The computer-readable storage medium of claim 8, the operations further comprising:
    providing the customized testbench and the model to a power analysis platform.

14. The computer-readable storage medium of claim 8, the operations further comprising:
    receiving user-defined run-time parameters at the customized testbench.

15. A computing system for use in an electronic circuit design comprising:
    a processor generator configured to receive one or more user defined processor configurations and simultaneously generate an RTL model of the electronic circuit design and a customized testbench based upon, at least in part, the user defined processor configurations, wherein the customized testbench is mapped to an emulation platform during run-time.

16. The computing system of claim 15, the processor generator is further configured to:
    provide the RTL model to the emulation platform.

17. The computing system of claim 16, further comprising:
    a graphical user interface that allows for hotspot analysis of a specific configuration and a specific use case.

18. The computing system of claim 16, further comprising:
    a graphical user interface that allows for power consumption analysis for multiple configurations with multiple use cases.

19. The computing system of claim 15, the processor generator is further configured to:
    provide the customized testbench and the RTL model to a power analysis platform.

20. The computing system of claim 15, the processor generator is further configured to:
   provide user-defined run-time parameters at the customized testbench.

\* \* \* \* \*